US011703614B2

(12) United States Patent
Takahashi

(10) Patent No.: US 11,703,614 B2
(45) Date of Patent: Jul. 18, 2023

(54) ANTIREFLECTION FILM AND OPTICAL MEMBER

(71) Applicant: FUJIFILM Corporation, Tokyo (JP)

(72) Inventor: Hiroki Takahashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 16/591,447

(22) Filed: Oct. 2, 2019

(65) Prior Publication Data

US 2020/0033507 A1 Jan. 30, 2020

Related U.S. Application Data

(63) Continuation of application No. PCT/JP2018/011924, filed on Mar. 23, 2018.

(30) Foreign Application Priority Data

Apr. 12, 2017 (JP) .............................. JP2017-079008

(51) Int. Cl.
*G02B 1/115* (2015.01)
*G02C 7/02* (2006.01)

(52) U.S. Cl.
CPC .............. *G02B 1/115* (2013.01); *G02C 7/022* (2013.01)

(58) Field of Classification Search
CPC . G02B 1/115; G02B 3/00; G02C 7/022; B01J 21/06; B01J 23/10; B01J 23/26; B01J 27/24; B01J 35/02
See application file for complete search history.

(56) References Cited

U.S. PATENT DOCUMENTS 6,077,492 A 6/2000 Anpo et al.
2002/0012779 A1 1/2002 Miyashita et al.
(Continued)

FOREIGN PATENT DOCUMENTS

CN 1768280 A 5/2006
CN 1950307 A 4/2007
(Continued)

OTHER PUBLICATIONS

International Search Report issued in PCT/JP2018/011924; dated Jun. 19, 2018.
(Continued)

*Primary Examiner* — Balram T Parbadia
*Assistant Examiner* — Gabriel A Sanz
(74) *Attorney, Agent, or Firm* — Studebaker & Brackett PC

(57) ABSTRACT

An antireflection film 3 provided on an optical substrate 2 of an optical member 1 has a reflectivity adjusting film 4 including a first layer 10, a second layer 11 having a refractive index higher than a refractive index of the first layer 10, a third layer 12 having a refractive index lower than a refractive index of the second layer 11, and a photocatalyst film 5 including one or more photocatalytically active layers 14 containing titanium dioxide, in which a thickness of the reflectivity adjusting film measured from a surface 4a is equal to or greater than 20 nm and less than 150 nm, the photocatalyst film 5 is provided between the reflectivity adjusting film 4 and the optical substrate 2, an interface 5a between the photocatalyst film 5 and the reflectivity adjusting film is disposed at position spaced apart from the surface 4a by a distance equal to or shorter than 150 nm, and a total thickness of the photocatalytically active layers 14 is equal to or greater than 350 nm and equal to or smaller than 1,000 nm.

27 Claims, 3 Drawing Sheets

(56) References Cited

U.S. PATENT DOCUMENTS

| | | | |
|---|---|---|---|
| 2003/0186089 A1* | 10/2003 | Kikuchi | C03C 17/3417 428/432 |
| 2006/0077549 A1* | 4/2006 | Kikuchi | C03C 17/36 359/507 |
| 2006/0257590 A1 | 11/2006 | Nakamura | |
| 2007/0218264 A1 | 9/2007 | Gueneau et al. | |
| 2008/0239488 A1* | 10/2008 | Asakura | G02B 1/111 349/96 |
| 2009/0267270 A1* | 10/2009 | Murakami | B29C 39/148 264/447 |
| 2012/0162960 A1* | 6/2012 | Lin | G02B 5/0242 362/19 |
| 2012/0164458 A1 | 6/2012 | Biteau et al. | |
| 2014/0248507 A1* | 9/2014 | Kleptsyn | C09D 5/006 428/626 |
| 2014/0333996 A1* | 11/2014 | Saito | B32B 27/306 359/359 |
| 2016/0146993 A1* | 5/2016 | Kumagai | G02B 1/18 359/359 |
| 2017/0205538 A1* | 7/2017 | Furusato | G04C 3/14 |
| 2018/0217299 A1 | 8/2018 | Takahashi | |

FOREIGN PATENT DOCUMENTS

| | | |
|---|---|---|
| CN | 201327536 Y | 10/2009 |
| CN | 102460226 A | 5/2012 |
| JP | H09-262482 A | 10/1997 |
| JP | 2002-028495 A | 1/2002 |
| JP | 2003-287601 A | 10/2003 |
| JP | 2004-294521 A | 10/2004 |
| JP | 2008-003390 A | 1/2008 |
| JP | 2016-224113 A | 12/2016 |
| WO | 2008/123553 A1 | 10/2008 |
| WO | 2017/056598 A1 | 4/2017 |

OTHER PUBLICATIONS

International Preliminary Report on Patentability and Written Opinion issued in PCT/JP2018/011924; dated Oct. 15, 2019.

An Office Action issued by the China National Intellectual Property Administration dated Sep. 29, 2020, which corresponds to Chinese Patent Application No. 201880024723.1 and is related to U.S. Appl. No. 16/591,447 with English language translation.

An Office Action issued by the China National Intellectual Property Administration dated May 7, 2021, which corresponds to Chinese Patnet Application No. 201880024723.1 and is related to U.S. Appl. No. 16/591,447; with English language translation.

An Office Action mailed by China National Intellectual Property Administration dated Mar. 30, 2022, which corresponds to Chinese Patent Application No. 201880024723.1 and is related to U.S. Appl. No. 16/591,447 with English language translation.

An Office Action issued by the China National Intellectual Property Administration dated Nov. 12, 2021, which corresponds to Chinese Patent Application No. 201880024723.1 and is related to U.S. Appl. No. 16/591,447; with English language translation.

An Office Action mailed by China National Intellectual Property Administration dated Aug. 31, 2022, which corresponds to Chinese Patent Application No. 202110985368.8 and is related to U.S. Appl. No. 16/591,447 with English language translation.

* cited by examiner

ANTIREFLECTION FILM AND OPTICAL MEMBER

CROSS REFERENCE TO RELATED APPLICATION

This is a continuation of International Application No. PCT/JP2018/011924 filed on Mar. 23, 2018, and claims priority from Japanese Patent Application No. 2017-079008 filed on Apr. 12, 2017, the entire content of which is incorporated herein by reference.

BACKGROUND OF THE INVENTION

1. Field of the Invention

The present invention relates to an antireflection film and an optical member.

2. Description of the Related Art

In cameras such as a surveillance camera and an in-vehicle camera that are installed in outdoor spaces, dirt adheres to the surface of an optical member such as a lens or a cover. Generally, the surface of the optical member to which dirt has adhered becomes a water-repellent surface. In a case where the surface of the optical member having become a water-repellent surface is wet with water, water drops remain on the surface of the optical member and obstruct the view. As an antireflection film constituting the surface of an optical member, an antireflection film is known which allows the surface to maintain hydrophilicity by the self-cleaning action of titanium dioxide having a photocatalytic activity.

The antireflection film described in JP2008-003390A is an antireflection film which is provided on a substrate and constituted with 4 layers including layers of high refractive index formed of titanium dioxide and layers of low refractive index formed of silicon dioxide that are alternately laminated, in which the surface of the antireflection film is constituted with the layer of low refractive index. Regarding the thickness of each of the layers in examples, from the substrate side, a first layer which is a layer of high refractive index has a thickness of 15 nm, a second layer which is a layer of low refractive index has a thickness of 30 nm, a third layer which is a layer of high refractive index has a thickness of 120 nm, and a fourth layer which is layer of low refractive index constituting the surface has a thickness of 90 nm.

The antireflection film described in JP2016-224113A is an antireflection film which is provided on a substrate and constituted with 4 layers including layers of high refractive index formed of titanium dioxide and layers of low refractive index formed of silicon dioxide that are alternately laminated as in the antireflection film described in JP2008-003390A, in which the surface of the antireflection film is constituted with the layer of low refractive index. Regarding the thickness of each of the layers in examples, from the substrate side, a first layer which is a layer of high refractive index has a thickness of 20 nm, a second layer which is a layer of low refractive index has a thickness of 25 nm, a third layer which is a layer of high refractive index has a thickness of 240 nm, and a fourth layer which is a layer of low refractive index constituting the surface has a thickness of 90 nm.

SUMMARY OF THE INVENTION

The self-cleaning action of titanium dioxide is brought about by the decomposition of dirt having adhered to a surface by oxygen radicals generated in the titanium dioxide. In the antireflection film described in JP2008-003390A and the antireflection film described in JP2016-224113A, the third layer formed of titanium dioxide is covered with the fourth layer constituting the surface of each of the antireflection films. From the viewpoint of efficiently transporting oxygen radicals generated in the third layer to the surface of each of the antireflection films, it is preferable that the fourth layer is thin. Furthermore, from the viewpoint of increasing the amount of generated oxygen radicals, it is preferable that the third layer is thick.

Meanwhile, in order to realize an average reflectivity equal to or lower than 1% in a wavelength range of, for example, 400 nm to 700 nm in consideration of the practicality of each of the antireflection films, it is desirable that the fourth layer, which constitutes the surface of each of the antireflection films and is formed of silicon dioxide, has a thickness equal to or greater than 20 nm, and the third layer which is adjacent to the fourth layer and formed of titanium dioxide has a thickness equal to or smaller than 150 nm.

In the antireflection film described in JP JP2008-003390A, the fourth layer formed of silicon dioxide has a thickness of 90 nm, and the third layer formed of titanium dioxide has a thickness of 120 nm. In this case, it is apprehended that oxygen radicals may be insufficient, and the obtained self-cleaning action may not be strong enough for maintaining the hydrophilicity of the surface. In the antireflection film described in JP2016-224113A, the fourth layer formed of silicon dioxide has a thickness of 90 nm, and the third layer formed of titanium dioxide has a thickness of 240 nm. In this case, it is apprehended that the band in which the average reflectivity becomes equal to or lower than 1% may be narrowed, and the antireflection film may lack practicality.

The present invention has been made in consideration of the circumstances described above, and an object thereof is to provide an antireflection film and an optical member capable of accomplishing both the improvement of reflectivity characteristics and maintenance of hydrophilicity of a surface.

An antireflection film according to an aspect of the present invention is an antireflection film provided on an optical substrate, comprising a reflectivity adjusting film including a first layer, a second layer that is disposed closer to a surface of the antireflection film than the first layer is and has a refractive index higher than a refractive index of the first layer, and a third layer that is disposed closer to the surface than the second layer is and has a refractive index lower than a refractive index of the second layer, and a photocatalyst film including one or more photocatalytically active layers containing titanium dioxide, in which a thickness of the reflectivity adjusting film measured from the surface is equal to or greater than 20 nm and less than 150 nm, the photocatalyst film is provided between the reflectivity adjusting film and the optical substrate, an interface between the photocatalyst film and the reflectivity adjusting film is disposed at a position spaced apart from the surface by a distance equal to or shorter than 150 nm, and a total thickness of the photocatalytically active layers is equal to or greater than 350 nm and equal to or smaller than 1,000 nm.

In an optical member according to an aspect of the present invention, the antireflection film is provided on an optical substrate.

According to the present invention, it is possible to provide an antireflection film and an optical member capable of accomplishing both the improvement of reflectivity characteristics and maintenance of hydrophilicity of a surface.

DESCRIPTION OF THE PREFERRED EMBODIMENTS

Figure 1:
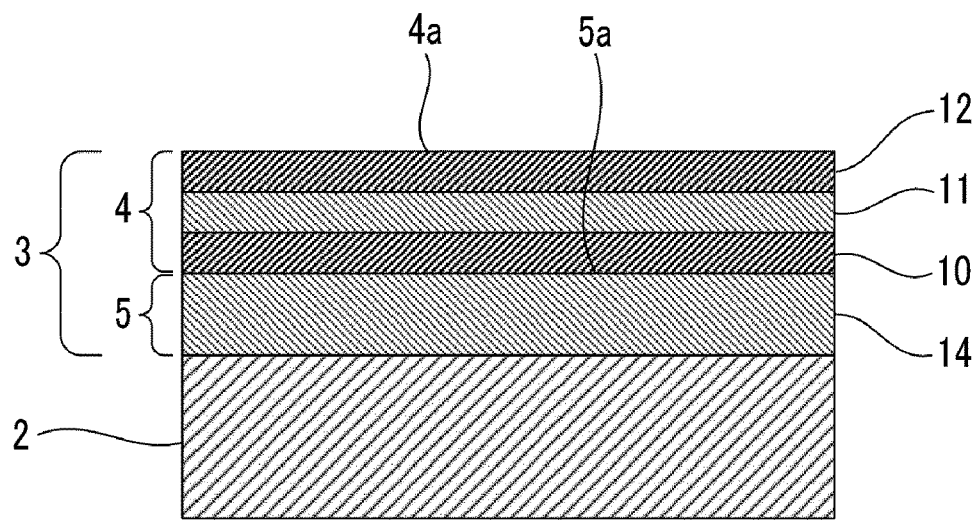
FIG. 1 is a schematic view showing an example of an optical member for illustrating an embodiment of the present invention.

An optical member 1 shown in FIG. 1 comprises an optical substrate 2 and an antireflection film 3 provided on the optical substrate 2.

The optical substrate 2 may be, for example, an optical element such as a lens or a film, and is not particularly limited in terms of form. Examples of the lens include an in-vehicle lens, a surveillance camera lens, an interchangeable lens, a television lens, and the like. In a case where the optical substrate 2 is a film, the optical member 1 is used by being bonded to the surface of an optical element such as a lens. As a material of the optical substrate 2, glass or a resin is used. Examples of the resin include polycarbonate, cycloolefin, polyimide, and the like. In view of the relationship with a manufacturing method of an antireflection film that will be described later, polyimide is suitable which has a glass transition temperature equal to or higher than 300° C. and desirably equal to or higher than 350° C. and has excellent heat resistance.

The antireflection film 3 has a reflectivity adjusting film 4 and a photocatalyst film 5 provided between the reflectivity adjusting film 4 and the optical substrate 2. By being irradiated with light, the photocatalyst film 5 generates oxygen radicals. By the oxygen radicals generated in the photocatalyst film 5, dirt having adhered to a surface 4a of the reflectivity adjusting film 4 exposed to the outside air is decomposed. By the self-cleaning action brought about by the oxygen radicals, the surface 4a is inhibited from becoming a water-repellent surface.

It is preferable that the surface 4a is formed of a hydrophilic material. Regarding the surface 4a, "hydrophilic" means that a contact angle between water and the surface 4a is equal to or smaller than 10°. The contact angle is measured by a titration method stipulated in JIS R 3257. Examples of the hydrophilic material forming the surface 4a include silicon dioxide ($SiO_2$) and the like.

The reflectivity adjusting film 4 includes a first layer 10, a second layer 11 that is disposed on the surface 4a side of the first layer 10 and has a refractive index higher than a refractive index of the first layer 10, and a third layer 12 that is disposed on the surface 4a side of the second layer 11 and has a refractive index lower than a refractive index of the second layer 11. Examples of materials forming the first layer 10 and the third layer 12 include materials with a low refractive index having a refractive index equal to or lower than 1.6, such as $SiO_2$, magnesium fluoride ($MgF_2$), silicon nitride ($Si_3N_4$), and aluminum oxide ($Al_2O_3$). Examples of materials forming the second layer 11 having a relatively high refractive index include materials with a high refractive index having a refractive index equal to or higher than 1.8, such as titanium dioxide ($TiO_2$), tin-doped indium oxide (ITO), zinc oxide (ZnO), tin dioxide ($SnO_2$), indium oxide ($In_2O_3$), niobium pentoxide ($Nb_2O_5$), tantalum pentoxide ($Ta_2O_5$), titanium nitride (TiN), and zirconium oxide (ZrO).

Figure 2:
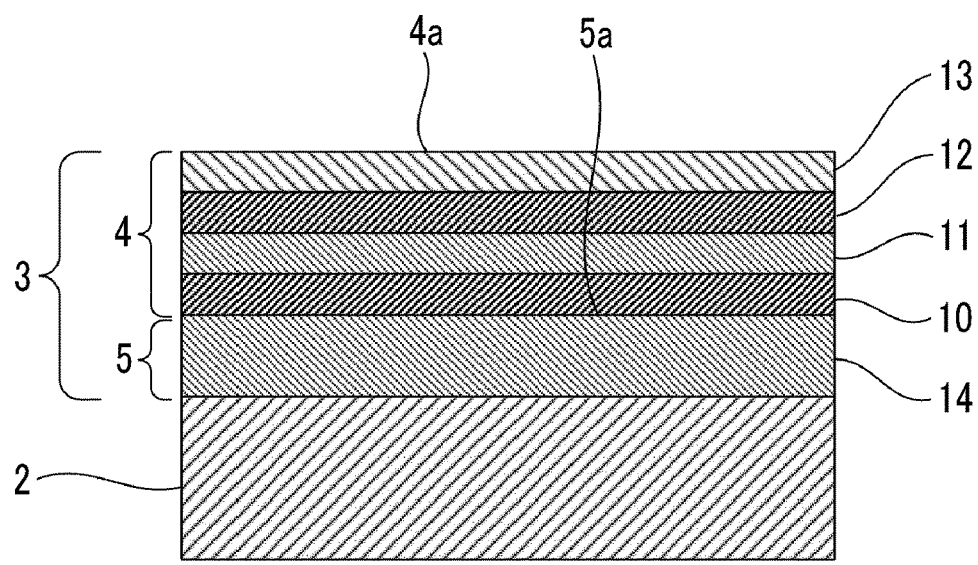
FIG. 2 is a schematic view of a modification example of the optical member in FIG. 1.

In a case where the third layer 12 is formed of hydrophilic $SiO_2$, as shown in FIG. 1, the surface 4a can be formed of the third layer 12. In contrast, in a case where the third layer 12 is formed of $MgF_2$ or $Al_2O_3$ that is not hydrophilic, as shown in FIG. 2, a hydrophilic surface layer 13 may be provided on the surface 4a side of the third layer 12 such that the surface 4a is formed of the surface layer 13.

From the viewpoint of making the surface 4a hydrophilic, the third layer 12 or the surface layer 13 forming the surface 4a may be formed as a porous layer having fine irregularities. However, from the viewpoint of improving abrasion resistance, it is preferable that the third layer 12 or the surface layer 13 is formed as a solid layer.

An interlayer may be provided between the first layer 10 and the second layer 11. Examples of the interlayer include a layer having a refractive index which is in between the refractive index of the first layer 10 and the refractive index of the second layer 11. Likewise, an interlayer may be provided between the second layer 11 and the third layer 12.

The thickness of each of the first layer 10, the second layer 11, and the third layer 12 is appropriately set according to the refractive index of each of the layers, the wavelength range in which reflection is inhibited, and the like. For example, in a case where the first layer 10 and the third layer 12 are formed of $SiO_2$, the second layer 11 is formed of $TiO_2$, and an average reflectivity is less than 1% in a wavelength range of 400 nm to 700 nm, a suitable thickness of the first layer 10 is 15 nm to 40 nm, a suitable thickness of the second layer 11 is 10 nm to 25 nm, and a suitable thickness of the third layer 12 is 20 nm to 100 nm. Here, the total thickness of the reflectivity adjusting film 4 is equal to or greater than 20 nm and less than 150 nm. In a case where the total thickness of the reflectivity adjusting film 4 is less than 20 nm, it is apprehended that reflectivity characteristics, in which the average reflectivity is equal to or lower than 1% in a wavelength range of 400 nm to 700 nm, may not be obtained. In a case where the total thickness of the reflectivity adjusting film 4 is equal to or greater than 150 nm, it is apprehended that the transport of the oxygen radicals generated in the photocatalyst film 5 to the surface 4a may be hindered, and self-cleaning action may not be obtained.

Figure 3:
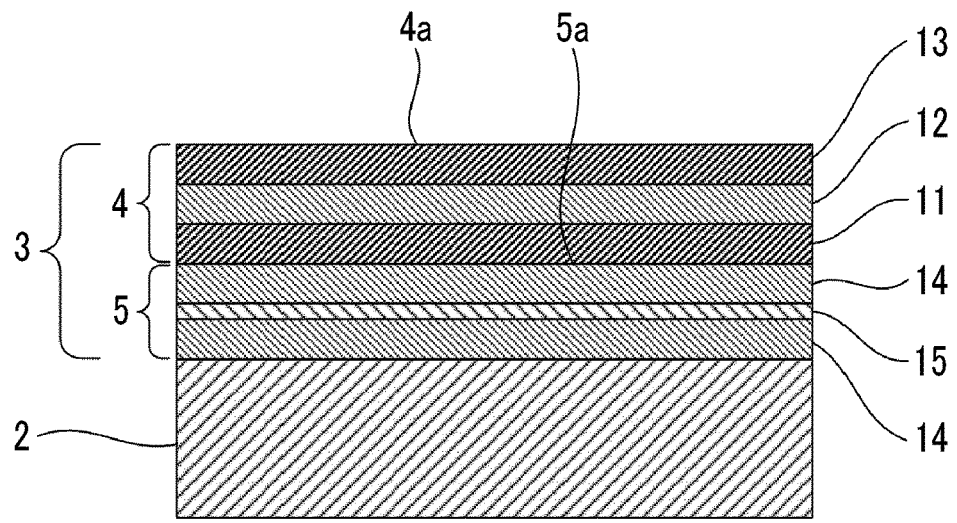
FIG. 3 is a schematic view of another modification example of the optical member in FIG. 1.

The photocatalyst film 5 includes a photocatalytically active layer 14 containing titanium dioxide ($TiO_2$). The photocatalyst film 5 may include one photocatalytically active layer 14 as shown in FIG. 1 or a plurality of photocatalytically active layers 14 as shown in FIG. 3. In a case where the photocatalyst film 5 includes a plurality of photocatalytically active layers 14, examples of materials of an interlayer 15 interposed between two adjacent photocatalytically active layers 14 include materials with a high refractive index (ITO, ZnO, $SnO_2$, $In_2O_3$, $Nb_2O_5$, $Ta_2O_5$, TiN, ZrO, and the like) except for materials with a low refractive index ($SiO_2$, $MgF_2$, $Si_3N_4$, and the like) and $TiO_2$.

From the viewpoint of causing self-cleaning action to be expressed, the total thickness of the photocatalytically active layer 14 is equal to or greater than 350 nm and equal to or smaller than 1,000 nm, and preferably equal to or greater than 350 nm and equal to or smaller than 500 nm. From the viewpoint of efficiently transporting the oxygen radicals generated in the photocatalytically active layer 14 to the surface 4a, an interface 5a between the photocatalyst film 5 and the reflectivity adjusting film 4 is disposed in a position spaced apart from the surface 4a by a distance equal to or shorter than 150 nm.

The thickness of each of the layers forming the reflectivity adjusting film 4 and the thickness of each of the layers forming the photocatalyst film 5 is a thickness measured by an optical film thickness gauge (built in a film deposition machine which will be described later). The film thickness of a sample is measured by observing the cross section thereof with a transmission electron microscope (TEM), and whether the thickness measured using the optical film thickness gauge and the thickness measured by TEM observation are identical with each other within a margin of error of ±3 nm is checked.

Figure 4:
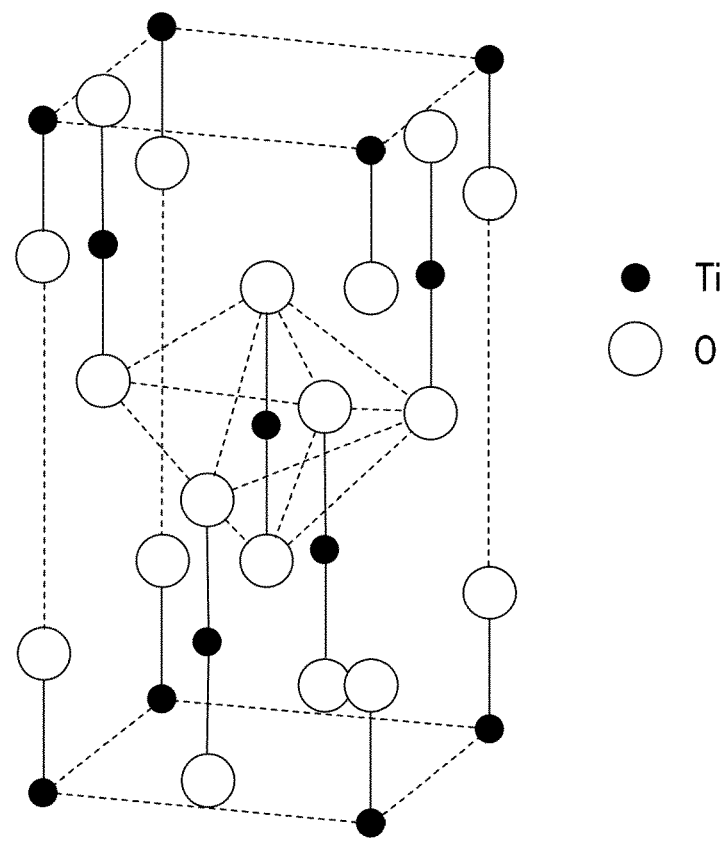
FIG. 4 is a schematic view showing a crystal structure, which is an anatase structure, of titanium dioxide.

It is preferable that the crystal structure of $TiO_2$ contained in the photocatalytically active layer 14 is an anatase structure. The photocatalytic activity of $TiO_2$ having an anatase structure is better than the photocatalytic activity of $TiO_2$ having a rutile structure. As shown in FIG. 4, the anatase crystal structure is a tetragonal system. In this structure, Ti is surrounded by six O atoms.

$TiO_2$ contained in the photocatalytically active layer 14 may be doped with at least one or more kinds of elements selected from the group consisting of nitrogen (N), sulfur (S), chromium (Cr), antimony (Sb), and cerium (Ce). In a case where $TiO_2$ is doped with these elements, the photocatalytic activity of the photocatalytically active layer 14 can be further enhanced. A suitable doping amount represented by a molar ratio between Ti and a doping element is equal to or higher than 0.01 mol % and equal to or lower than 0.05 mol %. In a case where some of Ti ions within the surface of a $TiO_2$ film are substituted with cations ($Cr^{3+}$, $Sb^{3+}$, and $Ce^{3+}$) or in a case where some of oxygen ions within the surface of a $TiO_2$ film are substituted with anions (N and S (valencies thereof are too diverse to be listed)), the photocatalytic activity can be improved. Here, in a case where the amount of the doping element is less than 0.01 mol %, the photocatalytic activity of the $TiO_2$ film may be not be improved even though the ions are substituted as described above. Furthermore, in a case where the amount of the doping element is higher than 0.05 mol %, it is apprehended that the doping element may be aggregated within the surface of the $TiO_2$ film, and the photocatalytic activity of the $TiO_2$ film may deteriorate.

The antireflection film 3 is manufactured by depositing the photocatalyst film 5 and the reflectivity adjusting film 4 in this order onto the optical substrate 2. For the deposition, a vapor deposition method can be used. The deposition of the reflectivity adjusting film 4, which includes the first layer 10 of low refractive index such as $SiO_2$, the second layer 11 of high refractive index such as $TiO_2$, and third layer 12 of low refractive index such as $SiO_2$, by means of a vapor deposition method is known. Therefore, hereinafter, the deposition of the photocatalyst film 5 will be described.

For depositing the photocatalytically active layer 14 containing $TiO_2$, titanium pentoxide ($Ti_3O_5$) can be used as a vapor deposition material. In a case where $Ti_3O_5$ is used as a vapor deposition material, a photocatalytically active layer 14 with fewer oxygen vacancies can be formed than in a case where $TiO_2$ is used as a vapor deposition material.

In a case where $TiO_2$ contained in the photocatalytically active layer 14 is irradiated with light, electrons in a valance band are excited to be in a conduction band. By the electrons excited to be in a conduction band, oxygen is reduced, and oxygen radicals are generated. In this electron transition, oxygen vacancies form a trap level that is in between a valence band level and a conduction band level, and the electrons excited to be in the conduction band are entrapped by the oxygen vacancies. As a result, electrons contributing to the generation of oxygen radicals are reduced, and the photocatalytic activity deteriorates. In a case where $Ti_3O_5$ is used as a vapor deposition material, it is possible to inhibit the generation of oxygen vacancies and to enhance the photocatalytic activity of the photocatalytically active layer 14.

During the deposition of the photocatalytically active layer 14, the temperature of the optical substrate 2 is preferably equal to or higher than 300° C. and equal to or lower than 350° C. In a case where the temperature of the optical substrate 2 is within the above range, it is possible to promote the generation of $TiO_2$ having an anatase structure. In a case where the temperature of the optical substrate 2 is excessively low (for example, equal to or lower than 200° C.), $TiO_2$ having an amorphous structure that does not exhibit photocatalytic activity is generated. In a case where the temperature of the optical substrate 2 is excessively high (for example, equal to or higher than 400° C.), $TiO_2$ having a rutile structure is generated.

The photocatalytically active layer 14 is preferably deposited in an atmosphere to which oxygen is introduced, and a flow rate of oxygen, expressed as a flow rate at 0° C., is preferably equal to or higher than $100 \times 1.69 \times 10^{-3}$ Pa·m$^3$/sec and equal to or lower than $120 \times 1.69 \times 10^{-3}$ Pa·m$^3$/sec. In a case where the photocatalytically active layer 14 is deposited under the condition described above, the crystallinity of $TiO_2$ having an anatase structure can be enhanced, and the photocatalytic activity of the photocatalytically active layer 14 can be further improved.

The photocatalyst film 5 formed on the optical substrate 2 is preferably annealed, the temperature of the annealing atmosphere (hereinafter, described as annealing temperature) is preferably equal to or higher than 350° C. and equal to or lower than 400° C., and the annealing time is preferably equal to or longer than 2 hours and equal to or shorter than 6 hours. In a case where the photocatalyst film 5 is annealed under the condition described above, the persistency of the photocatalytic activity of the photocatalytically active layer 14 can be improved.

Presumably, the persistence of photocatalytic activity brought about by annealing the photocatalyst film 5 may be involved with the reduction of a level of impurities contained in $TiO_2$. It is considered that the level of impurities contained in $TiO_2$ may become a trap level during the electron transition occurring in $TiO_2$ just like the level of oxygen vacancies, and hence the photocatalytic activity of the photocatalytically active layer 14 may deteriorate. In an experiment performed by the inventors of the present invention, by electron paramagnetic resonance (ESR) spectroscopy, it has been confirmed that the level of impurities contained in $TiO_2$ is reduced by annealing the photocatalyst film 5 under the condition described above.

The photocatalytic activity-retaining effect of the photocatalytically active layer 14 that is brought about by annealing is also affected by the annealing atmosphere. In a case where the photocatalyst film 5 is annealed in the air, the photocatalytic activity-retaining effect can be further improved than in a case where the photocatalyst film 5 is annealed in oxygen.

In a case where $TiO_2$ contained in the photocatalyst film 5 (photocatalytically active layer 14) is doped with different elements (N, S, Cr, Sb, and Ce), doping can be performed on a sample, on which a $TiO_2$ film is deposited, by using an ion implanter. As a doping technique, for example, the technique described in JP1997-262482A (JP-H09-262482A) can be used. After $TiO_2$ is doped with different elements, the reflectivity adjusting film 4 is deposited.

Hereinafter, experimental examples will be described.

<Crystal Structure of $TiO_2$ Photocatalyst Film>

By using $Ti_3O_5$ as a vapor deposition material and super white glass (FD110 manufactured by HOYA Corporation) as an optical substrate, a single-layered photocatalyst film formed of $TiO_2$ having a thickness of 300 nm was deposited on the optical substrate by means of electron beam vapor deposition. As a film deposition machine, ACE-1800 manufactured by SHINCRON CO., LTD. was used. In a state where the temperature of the optical substrate used at the time of forming the photocatalyst film was being varied within a range of a non-heating temperature to 400° C., and a flow rate of oxygen introduced into a chamber of the film deposition machine was being varied within a range of 0 to $120 \times 1.69 \times 10^{-3}$ Pa·m$^3$/sec, X-ray diffraction (XRD) spectroscopy was performed on the obtained photocatalyst film, and the crystal structure of $TiO_2$ contained in the photocatalyst film was analyzed. The XRD spectroscopy was performed using the following measurement apparatus under the following condition.

Apparatus: RINT-2500 (manufactured by Rigaku Corporation)

Light source: Cu Kα 55 Kv, 280 mA

Optical system: Divergence slit (DS): 1.0°

Scattering slit (SS): 1.0°

Receiving slit (RS): 0.3 mm

The crystal structure analysis results are shown in Table 1.

TABLE 1

| | | Temperature of optical substrate [° C.] | | | | | |
|---|---|---|---|---|---|---|---|
| | | Non-heating | 100 | 200 | 300 | 350 | 400 |
| Flow rate of oxygen [$1.69 \times 10^{-3}$ Pa·m$^3$/sec] | 0 | Amorphous | Amorphous | Amorphous | Anatase | Anatase | Anatase + rutile |
| | 50 | Amorphous | Amorphous | Amorphous | Anatase | Anatase | Anatase + rutile |
| | 70 | Amorphous | Amorphous | Amorphous | Anatase | Anatase | Anatase + rutile |
| | 100 | Amorphous | Amorphous | Amorphous | High-crystallinity anatase | High-crystallinity anatase | Anatase + rutile |
| | 120 | Amorphous | Amorphous | Amorphous | High-crystallinity anatase | High-crystallinity anatase | Anatase + rutile |

As shown in Table 1, in a case where the temperature of the optical substrate used at the time of depositing the photocatalyst film was equal to or higher than 300° C. and equal to or lower than 350° C., $TiO_2$ having an anatase structure was obtained. Furthermore, in a case where the amount of oxygen, expressed as an amount at 0° C., introduced at the time of depositing the photocatalyst film was equal to or greater than $100 \times 1.69 \times 10^{-3}$ Pa·m$^3$/sec and equal to or smaller than $120 \times 1.69 \times 10^{-3}$ Pa·m$^3$/sec, $TiO_2$ having an anatase structure with high crystallinity excellent in photocatalytic activity was obtained. Regarding the crystallinity of $TiO_2$, FIG. 5 shows the results of XRD spectroscopy performed by setting the temperature of the optical substrate to be 300° C. and setting the amount of oxygen introduced to be $70 \times 1.69 \times 10^{-3}$ Pa·m$^3$/sec, and FIG. 6 shows the results of XRD spectroscopy performed by setting the temperature of the optical substrate to be 300° C. and setting the amount of oxygen introduced to be $100 \times 1.69 \times 10^{-3}$ Pa·m$^3$/sec.

Figure 5:
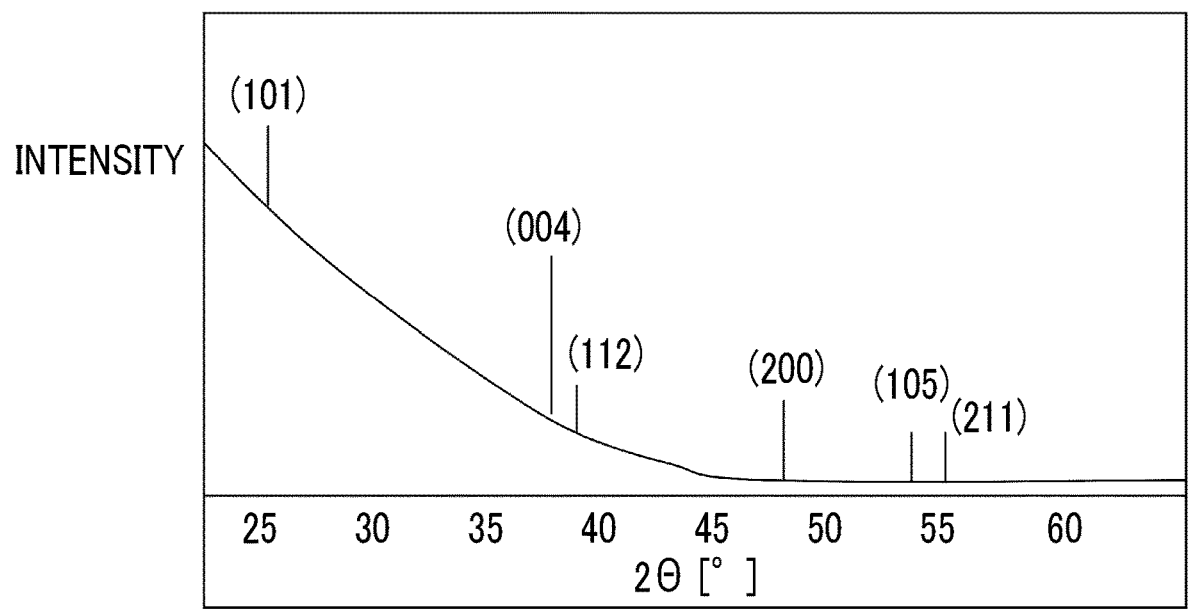
FIG. 5 is a graph showing the results of XRD spectroscopy performed on a photocatalyst film formed of titanium dioxide.
Figure 6:
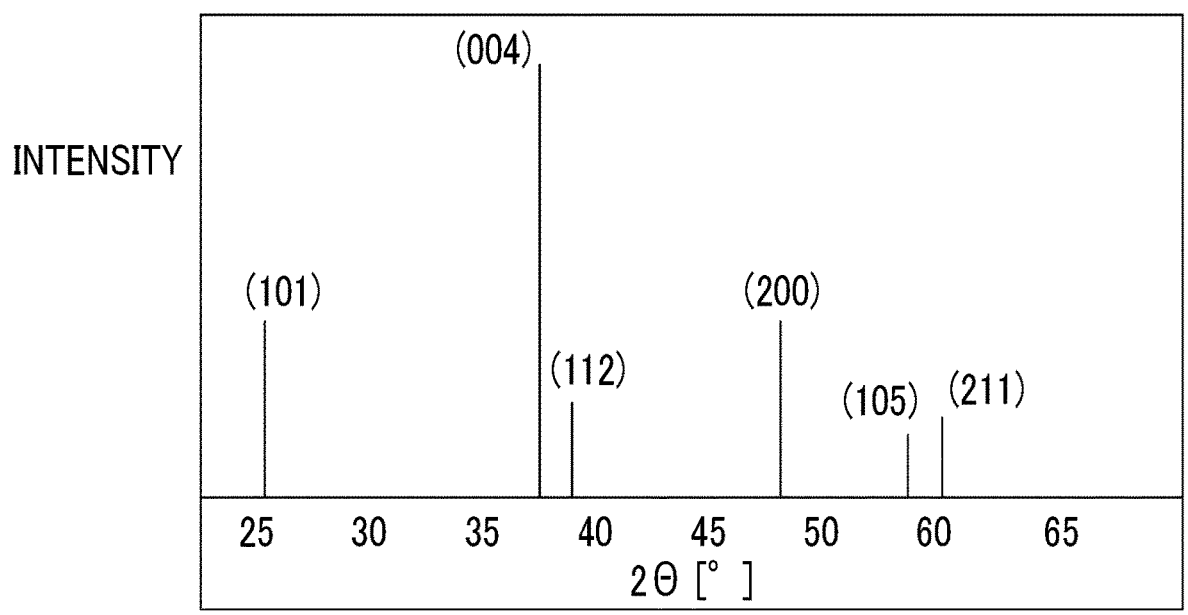
FIG. 6 is a graph showing the results of XRD spectroscopy performed on a photocatalyst film formed of titanium dioxide.

In all of the results of XRD spectroscopy shown in FIG. 5 and FIG. 6, the XRD peak position is identical to the peak position of the anatase-type $TiO_2$. However, in the results of XRD spectroscopy shown in FIG. 6, the base line is lower on a low angle side (2θ≤40°) than in the results of XRD spectroscopy shown in FIG. 5, and the intensity of each peak is higher than in the results of XRD spectroscopy shown in FIG. 5. From this result, it is understood that the crystallinity of $TiO_2$ becomes relatively high in a case where the amount of oxygen introduced is set to be $100 \times 1.69 \times 10^{-3}$ Pa·m$^3$/sec.

<Film Thickness Dependency of Photocatalytic Activity of Photocatalyst Film>

Then, the relationship between the photocatalytic activity of the $TiO_2$ photocatalyst film and the film thickness was evaluated. By using $Ti_3O_5$ as a vapor deposition material and super white glass (FD110 manufactured by HOYA Corporation) as an optical substrate, a single-layered photocatalyst film formed of $TiO_2$ was deposited on the optical substrate by means of electron beam vapor deposition. Thereafter, by using $SiO_2$ as a vapor deposition material, a $SiO_2$ film having a thickness of 50 nm was deposited on the photocatalyst film by means of electron beam vapor deposition, thereby preparing an evaluation sample. At the time of depositing the photocatalyst film, the temperature of the optical substrate was set to be two kinds of temperatures, 300° C. and 350° C., and the amount of oxygen introduced was set to be $100 \times 1.69 \times 10^{-3}$ Pa·m$^3$/sec. At the time of depositing the $SiO_2$ film, the temperature of the optical substrate was set to be the same as the temperature adopted at the time of depositing the photocatalyst film, and the amount of oxygen introduced was set to be 0.

For a plurality of evaluation samples including photocatalyst films whose thicknesses varied within a range of 10 nm to 500 nm, a contact angle between the $SiO_2$ film as the sample surface and water was measured according to the following procedure. Based on the contact angle, the film thickness dependency of the photocatalytic activity of the photocatalyst film was evaluated. For measuring the contact angle, first, wax for automobiles ("New Wilson", trade name, manufactured by Wilson Waxes inc.) was applied to the sample surface by using a cotton swab. After more than 24 hours from the application of wax, the wax applied to the sample surface was removed using a neutral detergent and water, and a contact angle θ1 between the sample surface, from which the wax was removed, and water was measured. Furthermore, the sample surface was irradiated with ultraviolet, and after the irradiation, a contact angle θ2 between the sample surface and water was measured again. As an ultraviolet light source, a UV-B ultraviolet lamp 20WGL20SE manufactured by SANKYO DENKI Co., Ltd was used, and the irradiation was performed under the condition of a UV illuminance of 3 mw/cm$^2$ and an irradiation time of 40 minutes (corresponding to 7.2 J/cm$^2$). In addition, as a contact angle measuring apparatus, DM300 manufactured by Kyowa Interface Science Co., LTD. was used. Hereinafter, the contact angle measurement procedure described above will be referred to as WAX test.

The measured contact angles θ2 are shown in Table 2. Each of the contact angles θ2 in Table 2 is determined by measuring the contact angle three times for each sample and calculating the average of the measured contact angles.

TABLE 2

| | | Thickness of photocatalyst film [nm] | | | | | | |
|---|---|---|---|---|---|---|---|---|
| | | 10 | 50 | 100 | 200 | 300 | 350 | 400 | 500 |
| Temperature of optical substrate [° C.] | 300 | Equal to or greater than 40° | 32° | 27° | 18° | 10° | Equal to or smaller than 5° | Equal to or smaller than 5° | Equal to or smaller than 5° |
| | 350 | Equal to or greater than 40° | 30° | 25° | 16° | 9° | Equal to or smaller than 5° | Equal to or smaller than 5° | Equal to or smaller than 5° |

In all of the evaluation samples, the contact angle θ1 was equal to or greater than 50°. In contrast, as shown in Table 2, the contact angle θ2 measured after the sample, which had a photocatalyst film with a thickness equal to or greater than 350 nm, was irradiated with ultraviolet was equal to or smaller than 5° that is called "ultrahydrophilic". From this measurement result, it is understood that in order for $TiO_2$ contained in the photocatalyst film to express self-cleaning action, the thickness of the photocatalyst film (the total thickness of the photocatalytically active layer) needs to be equal to or greater than 350 nm.

<Persistency of Photocatalytic Activity of Photocatalyst Film>

Then, for the evaluation sample including a photocatalyst film with a thickness of 350 nm and the evaluation sample including a photocatalyst film with a thickness of 500 nm, annealing was performed in the air by varying the annealing temperature and the annealing time. Furthermore, the WAX test was repeatedly performed on the annealed samples, and based on the number of times of the test performed until the contact angle between the sample surface having been irradiated with ultraviolet and water became equal to or smaller than 5°, the persistency of the photocatalytic activity of the photocatalyst film was evaluated.

The persistency evaluation results are shown in Table 3. In Table 3, the number of times of the test is determined under the condition of an annealing time of 4 hours.

TABLE 3

| | | Annealing temperature [° C.] | | | | |
|---|---|---|---|---|---|---|
| | | 300 | 350 | 400 | 450 | 500 |
| Thickness of photocatalyst film 350 nm | Temperature of optical substrate 300° C. | 3 times | 10 times or more | 5 times | once | 0 |
| | Temperature of optical substrate 350° C. | 3 times | 10 times or more | 5 times | once | 0 |
| Thickness of photocatalyst film 500 nm | Temperature of optical substrate 300° C. | 3 times | 5 times | 10 times or more | 3 times | 0 |
| | Temperature of optical substrate 350° C. | 3 times | 5 times | 10 times or more | 3 times | 0 |

From Table 3, it is understood that in a case where the sample is annealed in the air under the condition of an annealing temperature equal to or higher than 350° C. and equal to or lower than 400° C., the persistency of the photocatalytic activity of the photocatalyst film is improved. Furthermore, it is understood that a suitable annealing temperature is dependent on the thickness of the photocatalyst film; in a case where the thickness of the photocatalyst film is 350 nm, the annealing temperature is preferably 350° C.; and in a case where the thickness of the photocatalyst film is 500 nm, the annealing temperature is preferably 400° C. Although the number of times of the test in Table 3 is determined under the condition of an annealing time of 4 hours, within a range of annealing time of 2 to 6 hours, the same results as shown in Table 3 were obtained.

<Reflectivity Characteristics and Self-Cleaning Action of Optical Member>

Then, the optical members shown in FIG. 1 and FIG. 2 were prepared, and the reflectivity characteristics and the self-cleaning action of the prepared optical members were evaluated. Each of the optical members of Example 1, Example 2, and Example 4 to Example 7 comprises the constitution shown in FIG. 1 that is obtained by depositing the single-layered photocatalyst film 5 formed of $TiO_2$ and the reflectivity adjusting film 4 in this order on the optical substrate 2, in which the reflectivity adjusting film 4 is constituted with the first layer 10 formed of $SiO_2$, the second layer 11 formed of $TiO_2$, and the third layer 12 formed of $SiO_2$ in this order from the optical substrate 2 side. The optical member of Example 3 comprises the constitution shown in FIG. 2 that is obtained by depositing the single-layered photocatalyst film 5 formed of $TiO_2$ and the reflectivity adjusting film 4 in this order on the optical substrate 2, in which the reflectivity adjusting film 4 is constituted with the first layer 10 formed of $MgF_2$, the second layer 11 formed of $TiO_2$, the third layer 12 formed of $MgF_2$, and the surface layer 13 formed of $SiO_2$ in this order from the optical substrate 2 side. The optical member of Example 8 is obtained by depositing the single-layered photocatalyst film 5 formed of $TiO_2$ and the single-layered reflectivity adjusting film 4 formed of $SiO_2$ in this order on the optical substrate 2.

In all of the optical members of Example 1 to Example 8, super white glass (FD110 manufactured by HOYA Corporation) was used as the optical substrate 2. The single-layered photocatalyst film 5 formed of $TiO_2$ was deposited by means of electron beam vapor deposition by using $Ti_3O_5$ as a vapor deposition material and setting the temperature of the optical substrate 2 to be 350° C. and the amount of oxygen introduced to be $100 \times 1.69 \times 10^{-3}$ Pa·m³/sec. In addition, the photocatalyst film 5 deposited on the optical substrate 2 was annealed in the air under the condition of an annealing temperature of 350° C. and an annealing time of 4 hours. Furthermore, the second layer 11, which was formed of $TiO_2$, of the reflectivity adjusting film 4 was deposited by means of electron beam vapor deposition by using $Ti_3O_5$ as a vapor deposition material and setting the temperature of the optical substrate 2 to be 350° C. and the amount of oxygen introduced to be $100 \times 1.69 \times 10^{-3}$ Pa·m³/sec. The first layer 10, the third layer 12, and the surface layer 13, which were formed of $SiO_2$, of the reflectivity adjusting film 4 were deposited by means of electron beam vapor deposition by using $SiO_2$ as a vapor deposition material and setting the temperature of the optical substrate 2 to be 350° C. and the amount of oxygen introduced to be 0. The first layer 10 and the third layer 12, which were formed of $MgF_2$, of the reflectivity adjusting film 4 were deposited by means of electron beam vapor deposition by using MgF$_2$ as a vapor deposition material and setting the temperature of the optical substrate 2 to be 350° C. and the amount of oxygen introduced to be 0.

The reflectivity characteristics were evaluated based on an average reflectivity in a wavelength range of 400 nm to 700 nm, the presence or absence of ripples (fluctuations) in a reflectivity characteristic curve in a wavelength range of 400 nm to 700 nm, and the magnitude of ripples. The average reflectivity is determined by measuring reflectivity at each wavelength at an interval of a wavelength of 1 nm and dividing the sum of the reflectivity by the number of times the reflectivity was measured. In a case where the average reflectivity was equal to or lower than 0.5% and no ripple was checked, the optical member was evaluated as A. In a case where the average reflectivity was equal to or lower than 1.0% and relatively weak ripples were checked, the optical member was evaluated as B. In a case where the average reflectivity was equal to or lower than 1.0% and relatively strong ripples were checked, the optical member was evaluated as C. In a case where the average reflectivity was higher than 1.0%, the optical member was evaluated as D. Furthermore, by performing the WAX test 10 times, the self-cleaning action was evaluated based on the contact angle between the surface 4a of the reflectivity adjusting film 4 having been irradiated with ultraviolet and water.

The results of evaluation of the reflectivity characteristics and the self-cleaning action are shown in Table 4.

Example 8 in which the reflectivity adjusting film 4 is constituted only with the first layer 10 formed of SiO$_2$, because the average reflectivity in a wavelength range of 400 to 700 nm is 1.3%, the optical member lacks practicality as an antireflection film. In contrast, in the optical members of Example 1 to Example 3, Example 6, and Example 7, in which the total thickness of the reflectivity adjusting film 4 is equal to or greater than 20 nm and less than 150 nm, the interface 5a of the photocatalyst film 5 is disposed at a position spaced apart from the surface 4a by a distance equal to or shorter than 150 nm, and the thickness of the photocatalyst film 5 is equal to or greater than 350 nm and equal to or smaller than 1,000 nm, the average reflectivity in a wavelength range of 400 to 700 nm is equal to or lower than 1.0%. Therefore, the optical members comprise practicality as an antireflection film. Furthermore, the contact angle of the surface 4a is equal to or smaller than 5°, and the hydrophilicity of the surface 4a is maintained by the self-cleaning action.

Particularly, in the optical members of Example 1 to Example 3 in which the thickness of the photocatalyst film 5 is equal to or greater than 350 nm and equal to or smaller than 500 nm, the average reflectivity in a wavelength range of 400 to 700 nm is equal to or lower than 0.5%, and the reflectivity characteristic curve in a wavelength range of 400 nm to 700 nm is smooth without ripples. These results show that the thickness of the photocatalyst film 5 is preferably equal to or greater than 350 nm and equal to or smaller than

TABLE 4

| | Reflectivity adjusting film | | | | Total thickness of reflectivity adjusting film [nm] | Photocatalyst film (thickness [nm]) | Average reflectivity (400 to 700 nm) | Pattern of reflectivity characteristics | Comprehensive evaluation of reflectivity characteristics | Surface contact angle [°] |
|---|---|---|---|---|---|---|---|---|---|---|
| | Surface layer (thickness [nm]) | Third layer (thickness [nm]) | Second layer (thickness [nm]) | First layer (thickness [nm]) | | | | | | |
| Experimental Example 1 | — | SiO$_2$(20) | TiO$_2$(10) | SiO$_2$(40) | 70 | Anatase TiO$_2$ (364) | 0.44% | No ripple | A | 4.8 |
| Experimental Example 2 | — | SiO$_2$(93) | TiO$_2$(23) | SiO$_2$(14) | 130 | Anatase TiO$_2$ (486) | 0.46% | No ripple | A | 4.8 |
| Experimental Example 3 | SiO$_2$(10) | MgF$_2$(78) | TiO$_2$(23) | MgF$_2$(18) | 129 | Anatase TiO$_2$ (364) | 0.49% | No ripple | A | 4.9 |
| Experimental Example 4 | — | SiO$_2$(110) | TiO$_2$(25) | SiO$_2$(180) | 315 | Anatase TiO$_2$ (350) | 5.52% | Weak ripples | D | 22.4 |
| Experimental Example 5 | — | SiO$_2$(93) | TiO$_2$(25) | SiO$_2$(14) | 132 | Anatase TiO$_2$ (200) | 0.50% | No ripple | A | 15.2 |
| Experimental Example 6 | — | SiO$_2$(96) | TiO$_2$(25) | SiO$_2$(15) | 136 | Anatase TiO$_2$ (600) | 0.55% | Weak ripples | B | 4.8 |
| Experimental Example 7 | — | SiO$_2$(96) | TiO$_2$(25) | SiO$_2$(15) | 136 | Anatase TiO$_2$ (1000) | 0.56% | Strong ripples | C | 4.8 |
| Experimental Example 8 | — | — | — | SiO$_2$(86) | 86 | Anatase TiO$_2$ (380) | 1.30% | Weak ripples | D | 12.5 |

As shown in Table 4, in the optical member of Example 4 in which the total thickness of the reflectivity adjusting film 4 is 315 nm, the interface 5a between the photocatalyst film 5 and the reflectivity adjusting film 4 is disposed at a position 315 nm below the surface 4a of the reflectivity adjusting film 4 that is deeper than a position 150 nm below the surface 4a. In this case, because the transport of oxygen radicals generated in the photocatalyst film 5 to the surface 4a is hindered, the self-cleaning action deteriorates. Consequently, the contact angle of the surface 4a is 22.4°. In the optical member of Example 5 in which the thickness of the photocatalyst film 5 is 200 nm, because the oxygen radicals generated in the photocatalyst film 5 are insufficient, the self-cleaning action deteriorates. Consequently, the contact angle of the surface 4a is 15.2°. In the optical member of 500 nm, and in a case where the thickness of the photocatalyst film 5 is within the above range, the reflectivity characteristics of the antireflection film 3 can be improved.

<TiO$_2$ Crystal Structure and Self-Cleaning Action of Photocatalyst Film>

All of the optical members of Example 9 to Example 11 comprise the same constitution as that of the optical member of Example 2. Here, the deposition condition of the single-layered photocatalyst film 5 formed of TiO$_2$ varies among the examples. In the optical member of Example 9, the photocatalyst film 5 was deposited by means of electron beam vapor deposition by setting the temperature of the optical substrate 2 to be 350° C. and setting the amount of oxygen introduced to be 100×1.69×10$^{-3}$ Pa·m$^3$/sec. In the optical member of Example 10, the photocatalyst film 5 was deposited by means of electron beam vapor deposition by setting the temperature of the optical substrate 2 to be 400° C. and setting the amount of oxygen introduced to be 100×1.69×10⁻³ Pa·m³/sec. In the optical member of Example 11, the photocatalyst film 5 was deposited by means of electron beam vapor deposition by setting the temperature of the optical substrate 2 to be 200° C. and setting the amount of oxygen introduced to be 100×1.69× 10⁻³ Pa·m³/sec. The crystal structure of $TiO_2$ contained in the photocatalyst film 5 deposited as above was analyzed by XRD spectroscopy. As a result, the optical member of Example 9 was found to have an anatase structure, the optical member of Example 10 was found to have a rutile structure, and the optical member of Example 11 was found to have an amorphous structure. For the optical members of Example 9 to Example 11, the WAX test was performed 10 times, and based on the contact angle between the surface 4a of the reflectivity adjusting film 4 having been irradiated with ultraviolet and water, the relationship between the $TiO_2$ crystal structure and the self-cleaning action was evaluated.

The results of evaluation of $TiO_2$ crystal structure and the self-cleaning action are shown in Table 5.

TABLE 5

|  | Reflectivity adjusting film | | | Total thickness of reflectivity adjusting film [nm] | Photocatalyst film (thickness [nm]) | Average reflectivity (400 to 700 nm) | Surface contact angle [°] |
|---|---|---|---|---|---|---|---|
|  | Third layer (thickness [nm]) | Second layer (thickness [nm]) | First layer (thickness [nm]) |  |  |  |  |
| Experimental Example 9 | $SiO_2$(93) | $TiO_2$(23) | $SiO_2$(14) | 130 | Anatase $TiO_2$ (486) | 0.46% | 4.8 |
| Experimental Example 10 | $SiO_2$(93) | $TiO_2$(23) | $SiO_2$(14) | 130 | Rutile $TiO_2$ (486) | 0.46% | 30 |
| Experimental Example 11 | $SiO_2$(93) | $TiO_2$(23) | $SiO_2$(14) | 130 | Amorphous $TiO_2$ (486) | 0.52% | 50 |

As shown in Table 5, in the optical member of Example 10 including the photocatalyst film 5 formed of $TiO_2$ having a rutile structure, the contact angle of the surface 4a of the reflectivity adjusting film 4 was 30°. In the optical member of Example 11 including the photocatalyst film 5 formed of $TiO_2$ having an amorphous structure, the contact angle of the surface 4a of the reflectivity adjusting film 4 was 50°. In contrast, in the optical member of Example 9 including the photocatalyst film 5 formed of $TiO_2$ having an anatase structure, the contact angle of the surface 4a of the reflectivity adjusting film 4 was 4.8°, and the hydrophilicity of the surface 4a was maintained by the self-cleaning action. These results show that it is preferable that $TiO_2$ contained in the photocatalyst film 5 has an anatase crystal structure, and in a case where the photocatalyst film 5 has such a structure, the photocatalytic activity of the photocatalyst film 5 can be improved, and the self-cleaning action can be enhanced.

<Doping for Photocatalyst Film and Self-Cleaning Action>

All of the optical members of Example 12 to Example 14 comprised the same constitution as that of the optical member of Example 2. Here, the single-layered photocatalyst film 5 containing $TiO_2$ was doped with elements varying among examples. In the optical member of Example 12, the photocatalyst film 5 was doped with nitrogen (N). In the optical member of Example 13, the photocatalyst film 5 was doped with chromium (Cr). In the optical member of Example 14, the photocatalyst film 5 was doped with cerium (Ce). The WAX test was performed 10 times on the optical members of Example 12 to Example 14, and based on the contact angle between the surface 4a of the reflectivity adjusting film 4 having been irradiated with ultraviolet and water, the relationship between the doping element and the self-cleaning action was evaluated.

The results of the evaluation of the doping element and the self-cleaning action are shown in Table 6.

TABLE 6

| | Reflectivity adjusting film | | | Total thickness of reflectivity adjusting film [nm] | Photocatalyst film (thickness [nm]) | Average reflectivity (400 to 700 nm) | Surface contact angle [°] |
|---|---|---|---|---|---|---|---|
| | Third layer (thickness [nm]) | Second layer (thickness [nm]) | First layer (thickness [nm]) | | | | |
| Experimental Example 12 | SiO$_2$(93) | TiO$_2$(23) | SiO$_2$(14) | 130 | TiO$_2$-xNx (486) | 0.46% | 4.1 |
| Experimental Example 13 | SiO$_2$(93) | TiO$_2$(23) | SiO$_2$(14) | 130 | TiO$_2$-xCrx (486) | 0.46% | 4.1 |
| Experimental Example 14 | SiO$_2$(93) | TiO$_2$(23) | SiO$_2$(14) | 130 | TiO$_2$-xCex (486) | 0.46% | 4.1 |

As shown in Table 6, in all of the optical member of Example 12 in which the photocatalyst film 5 was doped with N, the optical member of Example 13 in which the photocatalyst film 5 was doped with Cr, and the optical member of Example 14 in which the photocatalyst film 5 was doped with Ce, the average reflectivity in a wavelength range of 400 to 700 nm was lower than in the optical member of Example 2, and the contact angle of the surface 4a of the reflectivity adjusting film 4 was smaller than in the optical member of Example 2. These results show that TiO$_2$ contained in the photocatalyst film 5 may be doped with N, Cr, and Ce, and in a case where TiO$_2$ is doped with these elements, the photocatalytic activity of the photocatalyst film 5 can be improved, and the self-cleaning action can be enhanced. Presumably, in a case where TiO$_2$ is doped with sulfur (S), some of oxygen ions in TiO$_2$ may be substituted with S ions as in the case where TiO$_2$ is doped with N, and the photocatalytic activity of the photocatalyst film 5 may be improved. Furthermore, presumably, in a case where TiO$_2$ is doped with antimony (Sb), some of Ti ions may be substituted with Sb ions as in the case were TiO$_2$ is doped with Cr and Ce, and the photocatalytic activity of the photocatalyst film 5 may be improved.

<Self-Cleaning Action of Multilayered Photocatalyst Film>

In the optical members of Example 15 to Example 17, the photocatalyst film 5 and the reflectivity adjusting film 4 are deposited in this order on the optical substrate, the photocatalyst film 5 is constituted with the first photocatalytically active layer 14 formed of TiO$_2$, the interlayer 15 formed of SiO$_2$, and the second photocatalytically active layer 14 formed of TiO$_2$ in this order from the optical substrate 2 side, and the reflectivity adjusting film 4 is constituted with the first layer 10 formed of SiO$_2$, the second layer 11 formed of TiO$_2$, and the third layer 12 formed of SiO$_2$ in this order from the optical substrate 2 side. Here, the film thickness of the interlayer 15, which is formed of SiO$_2$, of the photocatalyst film 5 varies among the examples. In the optical member of Example 15, the film thickness of the interlayer 15 is 1 nm. In the optical member of Example 16, the film thickness of the interlayer 15 is 2 nm. In the optical member of Example 17, the film thickness of the interlayer 15 is 3 nm.

In all of the optical members of Example 15 to Example 17, super white glass (FD110 manufactured by HOYA Corporation) was used as the optical substrate 2. The first photocatalytically active layer 14 and the second photocatalytically active layer 14 formed of TiO$_2$ were deposited by means of electron beam vapor deposition by using Ti$_3$O$_5$ as a vapor deposition material and setting the temperature of the optical substrate 2 to be 350° C. and the amount of oxygen introduced to be 100×1.69×10$^{-3}$ Pa·m$^3$/sec. The interlayer 15 formed of SiO$_2$ was deposited by means of electron beam vapor deposition by using SiO$_2$ as a vapor deposition material and setting the temperature of the optical substrate 2 to be 350° C. and the amount of oxygen introduced to be 0. The photocatalyst film 5 deposited on the optical substrate 2 was annealed in the air under the condition of an annealing temperature of 350° C. and an annealing time of 4 hours. The second layer 11, which was formed of TiO$_2$, of the reflectivity adjusting film 4 was deposited by means of electron beam vapor deposition by using Ti$_3$O$_5$ as a vapor deposition material and setting the temperature of the optical substrate 2 to be 350° C. and the amount of oxygen introduced to be 100×1.69×10$^{-3}$ Pa·m$^3$/sec. Furthermore, the first layer 10, the third layer 12, and the surface layer 13, which were formed of SiO$_2$, of the reflectivity adjusting film 4 were deposited by means of electron beam vapor deposition by using SiO$_2$ as a vapor deposition material and setting the temperature of the optical substrate 2 to be 350° C. and the amount of oxygen introduced to be 0.

The WAX test was performed 10 times on the optical members of Example 15 to Example 17, and based on the contact angle between the surface 4a of the reflectivity adjusting film 4 having been irradiated with ultraviolet and water, the relationship between the thickness of the interlayer 15 of the photocatalyst film 5 and the self-cleaning action was evaluated.

The results of the evaluation of the relationship between the thickness of the interlayer 15 and the self-cleaning action are shown in Table 7.

TABLE 7

| | Reflectivity adjusting film | | | Total thickness of reflectivity adjusting film [nm] | Photocatalyst film | | | Total thickness of Photocatalytically active layer [nm] | Average reflectivity (400 to 700 nm) | Pattern of reflectivity characteristics | Comprehensive evaluation of reflectivity characteristics | Surface contact angle [°] |
|---|---|---|---|---|---|---|---|---|---|---|---|---|
| | Third layer (thickness [nm]) | Second layer (thickness [nm]) | First layer (thickness [nm]) | | Photocatalytically active layer 2 (thickness [nm]) | Interlayer (thickness [nm]) | Photocatalytically active layer 1 (thickness [nm]) | | | | | |
| Experimental Example 15 | SiO$_2$(95) | TiO$_2$(26) | SiO$_2$(14) | 135 | Anatase TiO$_2$ (243) | SiO$_2$(1) | Anatase TiO$_2$ (248) | 486 | 0.49% | No ripple | A | 4.8 |
| Experimental Example 16 | SiO$_2$(95) | TiO$_2$(26) | SiO$_2$(14) | 135 | Anatase TiO$_2$ (243) | SiO$_2$(2) | Anatase TiO$_2$ (248) | 486 | 0.48% | Weak ripples | B | 4.8 |
| Experimental Example 17 | SiO$_2$(93) | TiO$_2$(26) | SiO$_2$(13) | 132 | Anatase TiO$_2$ (243) | SiO$_2$(3) | Anatase TiO$_2$ (248) | 486 | 0.47% | Strong ripples | C | 4.8 |

As shown in Table 7, the photocatalyst film 5 in each of the optical members of Example 15 to Example 17 is approximately the same as the photocatalyst film 5 in the optical member of Example 2, except that whether or not the photocatalyst film 5 is divided into two photocatalytically active layers 14 by the interlayer 15 interposed therebetween. In each of the optical members of Example 15 to Example 17, the average reflectivity in a wavelength range of 400 to 700 nm is equal to or lower than 0.5% as in the optical member of Example 2. Furthermore, in each of the optical members of Example 15 to Example 17, the contact angle of the surface 4a of the reflectivity adjusting film 4 is 4.8° as in the optical member of Example 2. From these results, it is understood that the photocatalyst film 5 may include two photocatalytically active layers 14 by the interlayer 15 interposed therebetween.

As described so far, the antireflection film disclosed in the present specification is an antireflection film provided on an optical substrate, comprising an reflectivity adjusting film including a first layer, a second layer that is disposed closer to a surface of the antireflection film than the first layer is and has a refractive index higher than a refractive index of the first layer, a third layer that is disposed closer to the surface than the second layer is and has a refractive index lower than a refractive index of the second layer, and a photocatalyst film including one or more photocatalytically active layers containing titanium dioxide, in which a thickness of the reflectivity adjusting film measured from the surface is equal to or greater than 20 nm and less than 150 nm, the photocatalyst film is provided between the reflectivity adjusting film and the optical substrate, an interface between the photocatalyst film and the reflectivity adjusting film is disposed at a position spaced apart from the surface by a distance equal to or shorter than 150 nm, and a total thickness of the photocatalytically active layers is equal to or greater than 350 nm and equal to or smaller than 1,000 nm.

In the antireflection film disclosed in the present specification, the total thickness of the photocatalytically active layers is equal to or greater than 350 nm and equal to or smaller than 500 nm.

In the antireflection film disclosed in the present specification, the photocatalyst film includes one photocatalytically active layer.

In the antireflection film disclosed in the present specification, a crystal structure of the titanium dioxide contained in the photocatalytically active layer is an anatase structure.

In the antireflection film disclosed in the present specification, the photocatalytically active layer further contains at least one or more kinds of elements selected from the group consisting of nitrogen, sulfur, chromium, antimony, and cerium.

In the antireflection film disclosed in the present specification, the third layer is formed of silicon dioxide and formed on the surface.

In the optical member disclosed in the present specification, the antireflection film is provided on an optical substrate.

In the optical member disclosed in the present specification, the optical substrate is a lens.

The present invention can be used in optical members such as a lens and a cover of cameras such as surveillance camera and an in-vehicle camera that are installed in outdoor spaces.

Hitherto, embodiments of the present invention have been described. However, the embodiments are merely an example, and within the scope of the gist of the present invention, the present invention can be embodied by being modified in various ways.

EXPLANATION OF REFERENCES

1: optical member
2: optical substrate
3: antireflection film
4: reflectivity adjusting film
4a: surface
5: photocatalyst film
5a: interface
10: first layer
11: second layer
12: third layer
14: photocatalytically active layer
15: interlayer

What is claimed is:

1. An antireflection film provided on an optical substrate, comprising:
    a reflectivity adjusting film including a first layer, a second layer that is disposed closer to a surface of the antireflection film than the first layer is and has a refractive index higher than a refractive index of the first layer, and a third layer that is disposed closer to the surface than the second layer is and has a refractive index lower than a refractive index of the second layer; and
    a photocatalyst film including only one photocatalytically active layer containing titanium dioxide, wherein a thickness of the reflectivity adjusting film measured from the surface is equal to or greater than 20 nm and less than 150 nm, the photocatalyst film is provided between the reflectivity adjusting film and the optical substrate, an interface between the photocatalyst film and the reflectivity adjusting film is disposed at a position spaced apart from the surface by a distance equal to or shorter than 150 nm, a thickness of the photocatalytically active layer is equal to or greater than 350 nm and equal to or smaller than 1,000 nm, and the surface of the reflectivity adjusting film is exposed to air.

2. The antireflection film according to claim 1, wherein the thickness of the photocatalytically active layer is equal to or greater than 350 nm and equal to or smaller than 500 nm.

3. The antireflection film according to claim 2, wherein the thickness of the photocatalytically active layer is 364 nm.

4. The antireflection film according to claim 2, wherein the thickness of the photocatalytically active layer is 486 nm.

5. The antireflection film according to claim 1, wherein a crystal structure of the titanium dioxide contained in the photocatalytically active layer is an anatase structure.

6. The antireflection film according to claim 1, wherein the titanium dioxide contained in the photocatalytically active layer is doped with one or more kinds of elements selected from the group consisting of nitrogen, sulfur, chromium, antimony, and cerium.

7. The antireflection film according to claim 1, wherein the titanium dioxide contained in the photocatalytically active layer is doped with chromium.

8. The antireflection film according to claim 7, wherein doping amount represented by a molar ratio between titanium and chromium is equal to or higher than 0.01 mol % and equal to or lower than 0.05 mol %.

9. The optical member according to claim 7, wherein the optical substrate is a lens.

10. The antireflection film according to claim 1, wherein the titanium dioxide contained in the photocatalytically active layer is doped with antimony.

11. The antireflection film according to claim 10, wherein doping amount represented by a molar ratio between titanium and antimony is equal to or higher than 0.01 mol % and equal to or lower than 0.05 mol %.

12. The antireflection film according to claim 1, wherein the titanium dioxide contained in the photocatalytically active layer is doped with cerium.

13. The antireflection film according to claim 12, wherein doping amount represented by a molar ratio between titanium and cerium is equal to or higher than 0.01 mol % and equal to or lower than 0.05 mol %.

14. The antireflection film according to claim 1, wherein the third layer is formed of silicon dioxide and forms the surface.

15. The antireflection film according to claim 1, wherein the third layer forms the surface and is formed as a porous layer having fine irregularities.

16. The antireflection film according to claim 1, wherein the third layer forms the surface and is formed as a solid layer.

17. An optical member comprising:
an optical substrate; and
the antireflection film according to claim 1 is provided on the optical substrate.

18. The antireflection film according to claim 1, wherein the first layer and the third layer are formed of magnesium fluoride.

19. The antireflection film according to claim 1, wherein the first layer and the third layer are formed of silicon nitride.

20. The antireflection film according to claim 1, wherein the second layer is formed of tin-doped indium oxide.

21. The antireflection film according to claim 1, wherein the second layer is formed of zinc oxide.

22. The antireflection film according to claim 1, wherein the second layer is formed of tin dioxide.

23. The antireflection film according to claim 1, wherein the second layer is formed of indium oxide.

24. The antireflection film according to claim 1, wherein the second layer is formed of niobium pentoxide.

25. The antireflection film according to claim 1, wherein the second layer is formed of tantalum pentoxide.

26. The antireflection film according to claim 1, wherein the second layer is formed of titanium nitride.

27. An antireflection film provided on an optical substrate, comprising:
a reflectivity adjusting film including a first layer, a second layer that is disposed closer to a surface of the antireflection film than the first layer is and has a refractive index higher than a refractive index of the first layer, and a third layer that is disposed closer to the surface than the second layer is and has a refractive index lower than a refractive index of the second layer; and a photocatalyst film including one or more photocatalytically active layers containing titanium dioxide, wherein a thickness of the reflectivity adjusting film measured from the surface is equal to or greater than 20 nm and less than 150 nm, the photocatalyst film is provided between the reflectivity adjusting film and the optical substrate, an interface between the photocatalyst film and the reflectivity adjusting film is disposed at a position spaced apart from the surface by a distance equal to or shorter than 150 nm, a thickness of the photocatalytically active layer is equal to or greater than 350 nm and equal to or smaller than 1,000 nm, and the surface of the reflectivity adjusting film is exposed to air.

* * * * *